Figure 1:
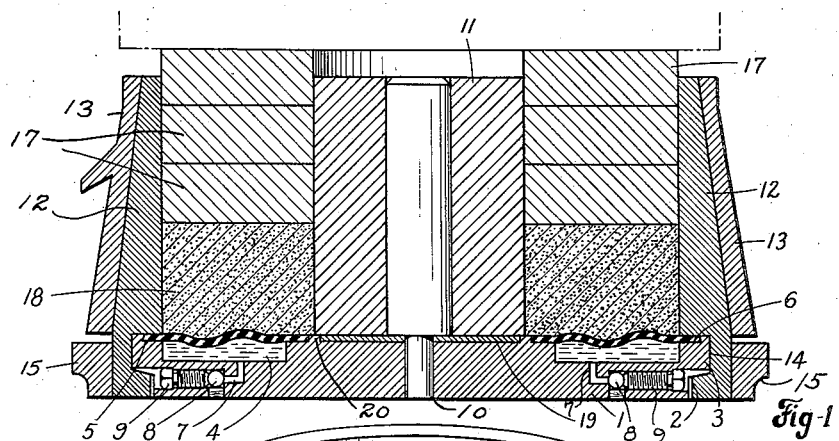

Dec. 7, 1937.       E. ANDERSON       2,101,015

HYDRAULIC MOLD

Filed Nov. 30, 1934

Inventor
Edward Anderson
By Walker and Sylvia
Attorney

Patented Dec. 7, 1937

2,101,015

UNITED STATES PATENT OFFICE 2,101,015

HYDRAULIC MOLD

Edward Anderson, Dayton, Ohio

Application November 30, 1934, Serial No. 755,326

12 Claims. (Cl. 18—34)

This invention relates to plastic molding apparatus, and more particularly to a sectional mold having automatic pressure equalizing means for assuring uniform density of the finished product.

While readily adaptable for molding sundry articles of various shapes and of different materials, for illustrative purposes but with no intent to unduly limit either its scope or application, the invention is herein shown and described as embodied in a mold for producing abrasive grinding wheels or the like.

In the manufacture of abrasive bodies, it is highly desirable that they shall be of uniform density throughout without occurrence of relatively hard and soft areas. It is found quite difficult to evenly spread or distribute the plastic material in the mold and consequently equalizing means has been found necessary when subjecting the material to molding pressure. It is not broadly new in this art to employ a yielding resistance by which excess pressure at one point is transmitted to a different area of lesser pressure to establish a condition of equilibrium. However, as heretofore employed such equalizing effect has not been coextensive with the molded body, but there was left a marginal rim portion which was not subject to the equalizing effect and which ordinarily was removed from the finished product.

When the abrasive body was of vitreous character, the material removed from such ununiform marginal rim area could be salvaged for reuse. However, many grinding wheels and other abrasive bodies are now manufactured wherein either natural or synthetic resins or analogous material is employed as a binder. Such material cannot be salvaged and the removal of marginal portions of unequal density involves a considerable waste and loss. The present mold is designed to afford equalizing pressure over the entire area and so eliminate the necessity for removal of the rim portion with consequent elimination of waste material.

Inasmuch as the product is subjected to quite heavy pressure during manufacture, it is necessary that the mold shall be capable of withstanding enormous expanding pressures and yet be adapted to afford quick and easy access for removal of the molded body. To this end, the present mold is of sectional construction, having interlocking engagement with an equalizing bottom and having tapered retaining means of such angle as to resist the expansive pressure but easily disengageable to release the mold sections.

The object of the invention is to simplify the construction as well as the means and mode of operation of molds for plastic materials whereby they may not only be economically constructed, but will be more efficient in use, capable of being quickly and conveniently assembled and disassembled, of great strength and durability, and unlikely to get out of repair.

A further object of the invention is to provide means and method of equalizing pressure upon the molded body whereby it will be of uniform density throughout.

A further object of the invention is to provide a mold having a pressure equalizing area extending to the perimeter of the mold whereby the density of the rim portion of the article may be equalized with the interior portions thereof.

A further object of the invention is to provide a sectional mold capable of being easily and quickly assembled and adapted to resist high internal pressure.

A further object of the invention is to provide easily disengageable means for securely holding the mold sections in assembly.

With the above primary and other incidental objects in view, as will more fully appear in the specification, the invention consists of the features of construction, the parts and combinations thereof, and the mode of operation, or their equivalents, as hereinafter described and set forth in the claims.

Figure 2:
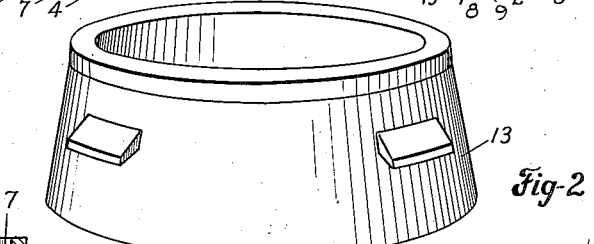
Figure 6:
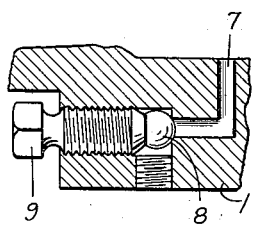
Figure 3:
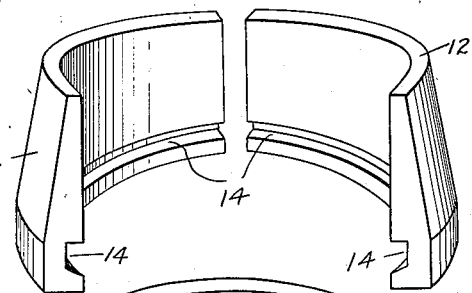
Figure 4:
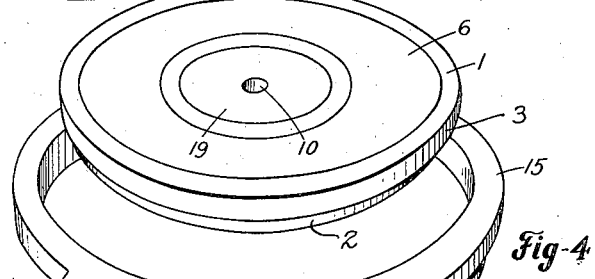
Figure 5:
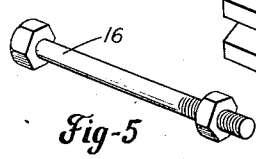

Referring to the accompanying drawing, wherein is shown the preferred but obviously not necessarily the only form of embodiment of the invention, Fig. 1 is a vertical sectional view of an assembled mold embodying the present invention, showing a molded body therein subject to forming pressure. Fig. 2 is a perspective view of the tapered exterior compression ring forming part of the mold. Fig. 3 is a perspective view of the segmental sections which form the inside wall of the mold. Fig. 4 is a perspective view of the mold base plate and the split ring for holding the parts of the mold in assembled position. Fig. 5 is a perspective view of the bolt provided for drawing the ends of the split ring together. Fig. 6 is an enlarged view of the valve structure forming a part of the fluid pressure flexible bottom of the mold.

Like parts are indicated by similar characters of reference throughout the several views.

While the invention is herein shown and described as embodied in a grinding wheel mold for which it is especially desirable, it is to be understood that the novel features may be utilized in molds for other articles, and hence the invention is not limited to the present purpose or application.

While pressure equalizing means of hydraulic character have heretofore been employed in plastic molding, such pressure equalizing means has been of restricted area, less than that of the molded body and has been incorporated in the ram or pressure applying device which, as before mentioned, necessitated removal and waste of un-uniform rim portions. In the present instance the pressure equalizing means is embodied in the base or drag of the mold and extends entirely to the side walls thereof.

Referring to the drawing, 1 is the base of the mold which, being for a grinding wheel, is of circular form and is peripherally rabbeted at 2 to form an overhanging shoulder or flange 3, the under side of which is slightly tapered. The top of the base 1 is formed with an annular recess 4, the margins of which are rabbeted at 5 to receive a flexible diaphragm 6 overlying the recess 4. For use, this recess is filled with water, oil, or other fluid. Inlet and outlet ports 7 are provided to the fluid space 4, through one of which the fluid may be introduced to fill such space while air is allowed to escape through the other of such ports. These ports are shown as provided with ball valves 8 securely held to their seats by set screws 9 to prevent escape of the fluid contents of the recess 4 when subjected to high pressure. It will be understood, however, that other forms of closure valves may be employed in lieu of the ball valve as shown.

The base 1 is provided with a central hole 10 to receive a mounting pin for supporting a core centrally of the mold. Cores 11 of various sizes may be interchangeably mounted upon the core pin to provide openings of different sizes and shapes within the molded body.

The side walls of the mold comprise segmental sections 12, of which there are usually three, although more sections may be employed for larger molds. The segmental wall sections 12 are exteriorly tapered to receive a correspondingly tapered exterior compression ring 13. The taper angle must be sufficiently small that the internal expansive pressure, when compression is applied to the plastic body within the mold, will not effect a loosening of the exterior restraining ring 13 by the camming action of the engaging surfaces, yet such taper angle must be sufficiently great to prevent undue sticking of the parts and enable the ring to be easily dislodged when the mold is to be disassembled.

In practice, it has been found that an angle of taper between five and ten degrees is most suitable, the angle usually employed being seven degrees or eight degrees.

At their lower margins, the wall segments 12 are provided interiorly with grooves 14 to receive the projecting marginal flange 3 of the base member 1. The lower sides of these grooves are preferably slightly tapered or inclined to agree with the inclination of the under side of the marginal flange 3 of the base member. This slight inclination of the engaging faces of the tongue and groove assembly exerts a slight camming action in an axial direction as the segmental wall sections are contracted upon the base 1. To facilitate the contraction of the wall segments and further secure them against displacement, the lower portions of such segments are formed substantially cylindrical and are enclosed by a surrounding split ring 15 adapted to be contracted about the assembly by means of a clamp bolt 16.

When assembled for use, the wall segments 12 are positioned about the base member 1 with the peripheral flange of the latter engaging within the interior grooves 14 of the wall segments, thereby affording an interlocking tongue and groove connection. The wall segments are contracted in such relation upon the base 1 by the tightening of the clamp bolt 16 thereby contracting the surrounding slit ring 15, and by driving the tapered sleeve 13 tightly upon the tapered exterior of the wall segment assembly. The contraction of the wall segments about the base member 1 effects a slight camming action between the beveled faces of the peripheral flange 3 of the base 1 and that of the interior groove 14 of each of the wall segments 12 by which the wall sections are firmly and securely seated upon the base 1.

The molding material, when placed within the mold, is loose and somewhat fluffy and the body of material is considerably deeper than when compressed into the finished product. One or more pressure rings 17 are superposed upon the body of molding material and the mold with its contents are placed in a hydraulic press and subjected to quite high pressure by which the material is compressed as shown at 18.

The pressure upon the material being transmitted therethrough to the flexible diaphragm distorts the diaphragm depressing it in areas of greater density and thereby displacing the fluid contents within the recess 4 by forcing the fluid to areas of lesser pressure where the diaphragm may be bulged upwardly until the pressures are equalized over the entire area. It is to be noted that the recess 4 and hence the flexible diaphragm extends to the line of the side walls whereby the rim portions of the molded body are included in such pressure equalizing effect. As a result of the distortion of the diaphragm due to variation of pressures, the under side of the molded body will possess a somewhat undulating surface which may be reduced to a plane surface by finishing operation, with loss of much less material than results from removal of the rim and furthermore molds of lesser size may be employed for a given size of grinding wheel due to the fact that the full area of the molded body is usable.

The taper of the wall segments and retaining ring is such that while it securely resists internal pressure, the ring is easily and readily dislodged to release the segments and facilitate the removal of the finished grinding wheel.

In the drawing, there is shown a concentric plate 19 which performs no specific function in relation to the process or product, but is of material advantage in applying the flexible diaphragm 6. The diaphragm 6 is preferably, although not necessarily, of rubber. It will be noted that the outermost rabbet 5 extends beyond the margin of the fluid receiving recess 4 beneath the side wall sections, and the margins of the rabbets are slightly undercut on approximately a five degree angle. The diaphragm being commensurate with the rabbets 5 within which its margins are cemented is subject to the pressure of the wall segments beyond the recess 4. In assembling the diaphragm on the base member, the contacting surfaces within the rabbets 5, and the registering areas of the diaphragm are carefully cleaned and coated with adhesive cement. The diaphragm material is then stretched over the base member I under moderate tension, and pressure is applied to an overlying metal plate whereby the margins of the rabbets 5 are utilized as a blanking die to cut the tensioned rubber diaphragm material to the proper size and force the severed portion into seating relation within the rabbets 5 where it is secured by the cement. Without the central recess occupied by the concentric plate 19, there would be no clearance space to receive the medial portion of the diaphragm material when subjected to pressure. However, the medial area of the die being recessed, leaving between the central depression and the inner rabbet 5 only a narrow upstanding rib 20, upon severance of the diaphragm sheet by pressure against the shoulders of the rabbets, the waste portion of the rubber sheeting draws over the rib 20 into the central depression. The depression having served its purpose in the application of the diaphragm material, the plate 19 is subsequently inserted therein to fill such depression flush with the plane of the diaphragm for molding use.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A mold for plastics, including a base, separable segmental side walls having interlocking engagement with the base, a ring exteriorly surrounding the segmental wall sections for holding the wall sections in assembled relation, a flexible cover for the base upon which a plastic deposit may be received, and a fluid body confined between the flexible cover and the base and subject to displacement by unequalized pressure of the plastic deposit if placed thereon whereby the resistance to the pressure of the deposit will be equalized.

2. A mold for plastics, including a base, separable segmental side walls having axial camming engagement with the base under influence of radial contraction, an annular adjustable member surrounding the wall sections by adjustment of which the sections are contracted upon the base, and a mobile body upon which a deposit of plastic material may be placed within the mold and subject to distortion by unequal pressure of the plastic body thereon whereby the resistance to such pressure will be equalized.

3. A mold for plastics, including a bottom and side walls, said bottom having an annular recess therein extending substantially flush with the side walls, a flexible diaphragm underlying the side walls, a fluid body confined within the annular recess by said diaphragm and displaced by unequal pressure of a plastic deposit if placed upon the diaphragm to equalize such pressure and means for subjecting such plastic deposit to pressure against the yielding resistance of the flexible diaphragm.

4. A mold for plastics, including a circular bottom and standing side walls, the bottom having therein an annular groove coincident with the inner face of the side walls, a flexible diaphragm overlying the annular groove and having its margin extending therebeyond intermediate the side walls and bottom, and a fluid body confined within the annular groove by said diaphragm.

5. A mold for plastics, including a recessed bottom, side walls extending thereabove, a flexible diaphragm overlying the recess in the bottom of the mold, and a fluid body confined within the recess by said diaphragm and subject to displacement by unequal pressure of a plastic deposit if placed upon the diaphragm.

6. A mold for plastics, including a bottom and side walls, the bottom of the mold being yielding whereby unequal pressure of a plastic deposit if placed thereon will effect distortion of the yielding bottom to equalize such pressure and pressure applying means engageable with the side of the plastic deposit opposite that engaging the yielding bottom of the mold and exerting pressure thereon to relatively displace portions of the plastic deposit against the yielding resistance of said bottom.

7. A mold for plastics, including a bottom and side walls, a portion of the bottom of the mold being yielding wherey unequal pressure of a deposit of plastic material if placed thereon will effect distortion of the bottom to equalize said pressure and pressure means engageable with the top of the plastic deposit to compress the deposit between said pressure means and the yielding bottom of the mold.

8. A mold for plastics, including a bottom and side walls, a portion of the bottom of the mold being yielding whereby unequal pressure of a deposit of plastic material if placed thereon will effect distortion of the bottom to equalize said pressure, the yielding portion of said bottom extending substantially flush with the side walls and means for applying pressure to the side of the deposit opposite that engaging the yielding bottom portion of the mold.

9. In a mold for plastic material, a receptacle having an interiorly recessed bottom, the recess of which extends substantially flush with the side walls of the receptacle, a flexible diaphragm overlying the recess to receive thereon a deposit of molding material, and a fluid body confined within the recess of the bottom beneath the flexible diaphragm and subject to displacement by unequal pressure of the molding material if placed thereon.

10. In a mold for plastic material, a base having a cavity in its upper side and a flexible diaphragm disposed over said cavity, a fluid body confined within the cavity by the diaphragm, externally tapered segmental wall sections having internal grooves adjacent their lower edges within which the margin of the base engages, a clamp ring surrounding the wall sections substantially in the plane of the base, and a tapered sleeve surrounding the wall sections.

11. In a mold for plastics, a base, segmental wall sections, said base and wall sections having tongue and groove interconnection therebetween and an exterior ring for radially contracting the wall sections with relation to the base, said base having a recess therein coextensive with the side walls, a flexible diaphragm overlying the recess, an inlet port to said recess through which a fluid may be admitted thereto, said recess having a vent for the escape of air therefrom, and means for closing the inlet port and vent.

12. In a mold for plastics, a base, exteriorly tapered segmental wall sections having tongue and groove interconnection with the base, and a tapered ring exteriorly surrounding the wall sections and conforming thereto, the adjustment of which tends to contract the wall sections upon the base, and a mobile body in said base subject to distortion by unequal pressure of a plastic deposit thereon whereby the pressure thereof is equalized.

EDWARD ANDERSON.